United States Patent
Farlotti

(10) Patent No.: US 9,310,241 B2
(45) Date of Patent: Apr. 12, 2016

(54) DEVICE FOR WEIGHING FLAT OBJECTS IN MOTION

(71) Applicant: NEOPOST TECHNOLOGIES, Bagneux (FR)

(72) Inventor: Laurent Farlotti, Pruniers (FR)

(73) Assignee: NEOPOST TECHNOLOGIES, Bagneux (FR)

(*) Notice: Subject to any disclaimer, the term of this patent is extended or adjusted under 35 U.S.C. 154(b) by 182 days.

(21) Appl. No.: 13/736,626

(22) Filed: Jan. 8, 2013

(65) Prior Publication Data

US 2013/0175100 A1    Jul. 11, 2013

(30) Foreign Application Priority Data

Jan. 10, 2012  (EP) .................................... 12305032
May 31, 2012  (EP) .................................... 12170317

(51) Int. Cl.
   *G01G 19/00*    (2006.01)
   *G07B 17/00*    (2006.01)

(52) U.S. Cl.
   CPC .............. *G01G 19/00* (2013.01); *G01G 19/005* (2013.01); *G07B 17/00661* (2013.01); *G07B 17/00467* (2013.01); *G07B 2017/00701* (2013.01)

(58) Field of Classification Search
   CPC ... G01G 19/00; G01G 19/002; G01G 19/005; G01G 19/035; G01G 19/4148; G01G 21/23; G07B 17/00467; G07B 17/00661; G07B 2017/00701; B07C 5/165
   USPC .................. 177/1, 4, 145, 184, 189
   See application file for complete search history.

(56) References Cited

U.S. PATENT DOCUMENTS

| 1,902,512 | A | * | 3/1933 | Arthur | ........................ 177/145 |
| 3,724,570 | A | * | 4/1973 | Chenut | ............................. 177/4 |
| 4,566,584 | A | * | 1/1986 | Lindstrom | .................... 177/145 |
| 4,705,413 | A | * | 11/1987 | Arnoldi et al. | .................. 400/56 |
| 4,778,018 | A | * | 10/1988 | Cordery et al. | ......... 177/210 FP |
| 4,903,788 | A | * | 2/1990 | Cordery et al. | ......... 177/210 FP |
| 5,726,393 | A | | 3/1998 | Lyga | |
| 5,922,944 | A | * | 7/1999 | Pieroni et al. | .................. 73/40.7 |
| 6,477,890 | B1 | * | 11/2002 | Hulsebus | ....................... 73/40.7 |
| 6,762,370 | B2 | * | 7/2004 | Sansone | ........................... 177/1 |

(Continued)

FOREIGN PATENT DOCUMENTS

EP    2065686 A1    6/2009

OTHER PUBLICATIONS

European Search Report for EP 12 30 5032, dated Apr. 12, 2012.

(Continued)

*Primary Examiner* — Peter Macchiarolo
*Assistant Examiner* — Natalie Huls
(74) *Attorney, Agent, or Firm* — Seed IP Law Group PLLC

(57) ABSTRACT

Device for weighing flat objects in motion comprising a conveyor (12) with drive rollers (22A, 22B) for conveying the flat objects along a transport path (14), a weighing plate (16) facing said transport path and comprising a set of free rollers (160) for receiving the flat objects, and a weighing sensor (18) attached to the weighing plate for measuring the weight of the flat objects during their passage between the conveyor and the weighing plate, wherein the weighing sensor is arranged above the transport path and the conveyor is adapted to move vertically in order to press the flat objects in motion against the weighing plate.

13 Claims, 2 Drawing Sheets

(56) References Cited

U.S. PATENT DOCUMENTS

| | | | |
|---|---|---|---|
| 6,940,025 B1* | 9/2005 | Salomon | 177/25.15 |
| 8,148,650 B2* | 4/2012 | Sye | 177/25.15 |
| 8,274,001 B2* | 9/2012 | Uber | 177/145 |
| 8,481,870 B2* | 7/2013 | Turner | 177/1 |
| 8,710,380 B2* | 4/2014 | Francke | 177/25.15 |
| 2005/0205307 A1* | 9/2005 | Salomon | 177/1 |
| 2009/0008859 A1* | 1/2009 | Fairweather et al. | 271/9.06 |
| 2011/0147095 A1 | 6/2011 | Sye | |
| 2011/0290569 A1* | 12/2011 | Turner | 177/1 |

OTHER PUBLICATIONS

European Search Report for EP 12 17 0317 dated Sep. 14, 2012.

* cited by examiner

DEVICE FOR WEIGHING FLAT OBJECTS IN MOTION

FIELD OF THE INVENTION

The present invention relates to a device for weighing items in motion. More specifically, it relates to the weighing of envelopes when travelling across a franking machine, in order to apply the correct rate.

PRIOR ART

Postage rates depend on various parameters such as service level, delivery address, dimensions and weight. Post offices have defined rate tables associating notably the weight of letters with the corresponding charges. Although the rate varies by increments, it is necessary to measure the weight accurately. Notably, it must be determined with an accuracy of +/−1 g if the weight is close to a value where the rate will change. Therefore franking machines are often associated or connected with a scale. Whenever one has to send a large number of letters per day, it becomes unpractical to weigh them manually. The franking machine may then include a dynamic scale as in US2011/147095 for example, so that the letters one by one are weighed in motion without slowing the franking process.

Dynamic scales are usually composed of a conveyor and a load cell. The whole conveyor, including motor, pulleys and belts, is supported by the load cell and the letter is transported at the same speed than in other parts of the franking machine, like for instance a printing station or a feeding module.

Optical sensors are disposed before and after the conveyor. The weighing system is activated once a letter has been detected by a first sensor. Depending on the speed of the conveyor, the franking machine determines a time window wherein the letter is entirely supported by the conveyor. The gap between two subsequent letters must be large enough to ensure that only one will be weighed at a time. The weight is measured only after the first sensor has detected the trailing edge of the letter, and a second sensor has indicated that the previous letter has left the dynamic scale. By comparing the weight of the empty conveyor and the conveyor plus the letter, the weight of the letter can be calculated by difference.

To make sure that the letter travels at a consistent speed, there shall be no slippage between the letter and the conveying belt. Rollers or flexible flaps are added to the conveyor in order to press the letter against the belt while it is travelling. Those rollers or flaps form part of the conveyor and are weighted altogether.

The dynamic scale is usually followed by the printing station where a postal indicium is printed on the letter after the postage charge has been calculated. During this operation, the letter is pressed against a printing plate by a movable drive mechanism, in order to keep a constant distance between the letter and the printhead. The friction between the letter and the reference printing plate shall be low enough not to damage the letter. The printing process may also require a constant speed. The movable drive mechanism usually comprises a combination of arms and springs, pulleys and belts, and a motor.

Franking machines can process letters of various thicknesses, typically 0.5 mm for postcards up to 20 mm. Therefore the drive mechanisms of the dynamic scale and the printing station are designed to operate within that range. It shall be noted that the reference side of the letter changes from the bottom (in the dynamic scale) to the top (in the printing station) and the transfer of a letter from the dynamic scale to the printing station may cause shocks and vibrations detrimental to the printing process.

The dynamic scale is a complex and costly part of the franking machine because the load cell supports the complete conveyor, which is often heavier than the letters to be weighed. Moreover the rollers or flaps may generate shocks when bouncing on the letter. The motor, pulleys and belt may also generate vibrations. These shocks and vibrations complicate the measure of the weight. In practice they often limit the throughput of the system.

OBJECT AND SUMMARY OF THE INVENTION

The present invention solves the above problems by providing a different arrangement of the dynamic scale. Instead of supporting the conveyor, the load cell (weighing sensor) is affixed to a weighing plate located above the envelope transport path. The envelope is pressed against the weighing plate by a movable drive mechanism as in the printing station. The applied load is big enough to ensure contact between the conveyor and the weighing plate whatever the weight of the actual envelope. Additionally, this load also compensates the weight of the weighing plate so that the load cell is constantly or sensibly constant loaded.

When an envelope travels through the scale, it is pressed against the weighing plate and its weight is subtracted from the load.

To achieve this function a new device for weighing flat objects in motion comprises a conveyor for conveying the flat objects along an transport path, a weighing plate facing said transport path and comprising a set of free rollers for receiving the flat objects, and a weighing sensor attached to the weighing plate for measuring the weight of the flat objects, wherein the weighing sensor is arranged above the transport path and the conveyor is adapted to move vertically in order to press the flat objects in motion against the weighing plate. Preferably, the conveyor is adapted to further apply a load which is constant or sensibly constant (depending on the selected implementation) regardless of the thickness of the flat object. The weighing plate comprises a set of free rollers which facing the conveyor belt in order to minimize the friction between the envelope in motion and the weighing plate.

In one embodiment, the load applied by the conveyor is obtained by a balance system comprising at least one lever arm attached at its upper end to the conveyor by a first pivot connection and attached at its lower end to a counterweight, said at least one lever arm being adaptable to rotate around at least a second pivot connection attached to a chassis of the device and attached to the at least one lever arm between its upper and lower ends.

In another embodiment, the load applied by the conveyor is obtained by a spring system comprising at least one lever arm attached by its lower end to a chassis of the device by a second pivot connection and attached to the upper end to the conveyor by a first pivot connection, and at least one spring attached to the chassis of the device and pushing the conveyor vertically in the upper direction. Advantageously, the spring has a tensile elongation at least equal to the length of the horizontal projection of said at least one lever arm and a coefficient of stiffness of at least 0.5 N/mm and typically 1 N/mm.

The spring can be a tension spring attached at its lower end to the chassis of the device and at its upper end to one end of at least a traction cable running around at least one pulley and the other end of said at least one traction cable is connected to the upper end of said at least one lever arm or a spiral spring attached at its central end to the chassis of the device, the other end of said at least one spiral spring being attached to the upper end of said at least one lever arm.

Preferably, a dashpot is placed under the transport path in order to reduce the shocks and vibrations due to the passage of the flat objects on the transport path.

The invention also concerns a mail machine comprising a device for weighing flat objects, particularly envelopes, in motion as described above.

BRIEF DESCRIPTION OF THE DRAWINGS

The actual construction, operation and advantages of the present invention will be better understood by referring to the following drawings in which like numerals identify like parts.

DETAILED DESCRIPTION OF EMBODIMENTS

Figure 1:
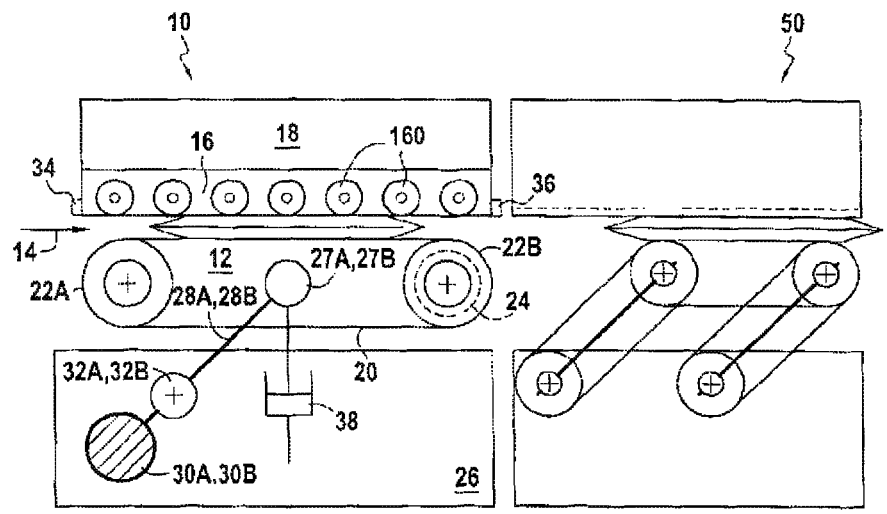
FIG. 1 shows a schematic view of an implementation of the device for weighing flat objects in motion using a counterweight system to maintain a constant load of the transport path on the weighing sensor.

FIG. 1 illustrates a first embodiment of the device for weighing flat objects in motion according to the invention.

In this first embodiment, the device 10 for weighing flat objects in motion comprises: a vertically movable conveyor 12 for conveying the mail items along a transport path 14, a weighing plate 16 disposed above the transport path 14 for receiving the mail items in motion, and a weighing sensor 18 attached to the weighing plate 16 and also disposed above the transport path 14. The weighing plate 16 comprises a set of free rollers 160 facing the conveyor 12.

The conveyor comprises at least a conveyor belt 20, driven by upstream and downstream drive rollers 22A, 22B engaged with a motor 24. The conveyor 12 is vertically movable (i;e moves against the gravity) in the frame (or chassis 26) of the device through at least first pivot connection 27A, 27B attached to at least a counterweight 30A, 30B via at least a lever arm 28A, 28B. More particularly, the upper ends of two lever arms 28A, 28B are attached on each side of the conveyor 12, sensibly midway between the rollers 22A, 22B. The other ends of the two lever arms 28A, 28B are each attached to the counterweight 30A, 30B. The two lever arms 28A, 28B are attached to the chassis 26 of the device by a second pivot connection 32A, 32B disposed between the counterweight 30A, 30B and the first pivot connection 27A, 27B. An input presence sensor 34 and an exit presence sensor 36 are located in front and in back of the conveyor (or the weighing plate), respectively, to detect the presence of the mail item on the conveyor in order to start the acquisition of the weight of the mail item by the weight sensor 18.

The counterweight 30A, 30B, through the lever arm 28A, 28B created by the pivot connections 27A, 27B, have the effect of pushing the conveyor 12 against the weighing plate 16 and apply a force at least equal to the weight of the heaviest mail item to weigh (about 1.5 kg). Optionally, a dashpot 38 is placed between the conveyor 12 and the chassis 26 of the device for reducing shocks and vibrations induced by the successive passage in the transport path 14 of thin and thick mail items between the conveyor 12 and the weighing plate 16.

The above device operates as follows. At rest, during an initialization phase of the device, the conveyor 12 is in contact with the weighing plate 16 via the set of free rollers 160 and thus maintains a constant load on the weighing plate greater than the weight of the heaviest mail item to weigh (about 1.5 kg). As the belt 20 is in touch with the set of free rollers, the horizontal effort between the conveyor and the plate is sensibly null. This constant load applied by the conveyor at rest is measured by the weight sensor 18 and is used as a tare so that when no mail item is present in the transport path 14, the weight sensor measures a null weight. When a mail item comes in front of the device, the conveyor belt 20 and its drive rollers 22A, 22B drive the mail item toward the printing station 50. During the moving of the mail item toward the printing station, the conveyor 12 presses the mail item against the weighing plate 16 via the set of free rollers 160. The load applied by the conveyor is ensured by the counterweights 30A, 30B through the lever formed by the lever arms 28A and 28B and the second pivot connections 32A, 32B which push vertically the conveyor 12 toward the weighing plate 16. When the mail item is fully supported by the conveyor, the input presence sensor 34 no longer detects the presence of the mail item, the acquisition of the weight of the mail item by the weight sensor 18 can begin and will be done until the mail item reaches the exit presence sensor 36. To avoid errors related to instantaneous measures, the weight sensor acquire several samples of the weight of the mail item before applying a filter function to all acquired samples. The applied function can simply be an average of the samples or can be more sophisticated as it is known in the art.

Precision bearings can be used for the two pivot connections so that no unwanted torque is transmitted to the arms. Notably, the torque generated by the motor, which may vary according to the weight of the mail item is not transmitted. In these conditions the counterweight is only balanced by the reaction of the weighing plate, and the load is independent of the thickness of the mail item. The horizontal effort applied to the weighing plate 16 is the same with or without a mail item and is anyway sensibly null.

Figure 2:
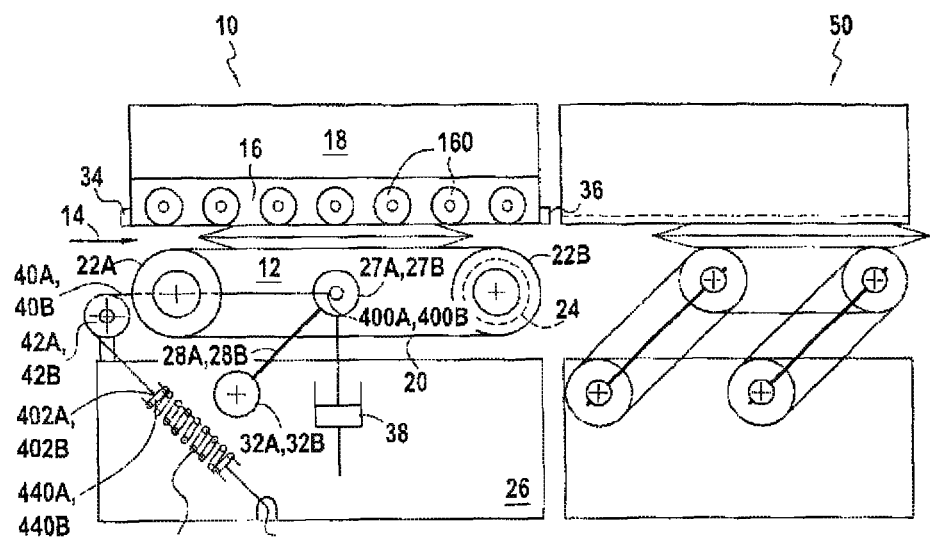
FIG. 2 shows a schematic view of another implementation of the device for weighing flat objects in motion using a tension spring system to maintain a sensibly constant load of the transport path on the weighing sensor.

FIG. 2 illustrates a second embodiment of the device for weighing flat objects in motion according to the invention. In this embodiment, the balance system formed by the lever arms 28A, 28B, the counterweights 30A, 30B and the second pivot connection 32A, 32B (allowing the conveyor 12 to maintain a constant load applied to the weighing plate 16 via the set of free rollers 160) is replaced by a tension spring system composed of traction cables, tension springs and pulleys, which do not maintain a constant load but a sensibly constant load only. As in the previous embodiment, the conveyor 12 comprises at least the conveyor belt 20 driven by the drive rollers 22A, 22B connected to the motor 24. The conveyor 12 is vertically movable in the frame (or chassis 26) of the device through at least first pivot connection 27A, 27B and at least a lever arm 28A, 28B. More particularly, the upper ends of two lever arms 28A, 28B are attached by two pivot connections 27A, 27B on each side of the conveyor 12, sensibly midway between the rollers 22A, 22B. The other ends of the two lever arms are attached to the chassis 26 of the device by a second pivot connection 32A, 32B. In this second embodiment, the upper ends of the two lever arms are also attached to the upper ends 400A, 400B of traction cables 40A, 40B. The traction cables 40A, 40B running around pulleys 42A, 42B and are connected by their lower ends 402A, 402B at the upper ends 440A, 440B of tension springs 44A, 44B. The tension springs 44A, 44B are connected by their lower end 442A, 442B to the chassis 26 of the device. The pulley 42A, 42B are mounted free in rotation on the chassis 26 of the device.

The tension springs 44A, 44B are mounted elongated so that when the device is at rest (ie. no mail item on the transport path 14), the springs are elongated.

In this second embodiment, the device operates as in the first embodiment except the following steps. Indeed, the sensibly constant load applied by the conveyor 12 is now provided by the combined action of traction cables 40A, 40B, pulleys 42A 42B, springs 44A, 44B, and two lever arms 28A and 28B. By rotating around the pivot connection 32A and 32B, the lever arms 28A, 28B cause the lowering of the conveyor 12 and the elongation of the springs 44A and 447B through the traction cables 40A, 40B and pulleys 42A, 42B. To ensure a sensibly constant load of the conveyor 12 on the weighing plate 16 or on the mail item regardless of the thickness of the mail item, the calibration of the spring is critical. Indeed, a defective calibration will imply a non-constant (variable) load.

Figure 3:
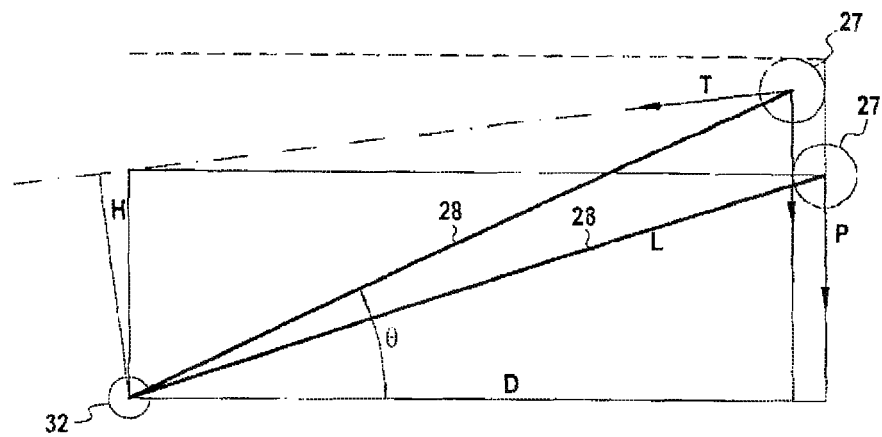
FIG. 3 shows a schematic representation of efforts in the tension spring system.

FIG. 3 illustrates the different forces that permit this calibration of the load spring in the tension spring system of FIG. 2. The wire is horizontal when an envelope 19 mm thick is in the scale (this is close to the maximum thickness). In this case the lever arm moves up when no envelope is in the scale but its vertically projected length H remains sensibly the same. The load spring is chosen so that its elongation is close to the horizontally projected length of the arm D. Then the torque applied on the lever arm by the spring is sensibly proportional to this length. As the torque applied by the conveyor is also proportional to this length, the load is sensibly constant within the range of angular positions of the lever arm as follows:

$Cp=-P*D=-P*L \cos \theta$ $Ct \approx H*T \approx H*k*D \approx H*k*L \cos \theta$ $Cp+Ct=0$ $P*L \cos \theta \approx H*k*L \cos \theta$ $P \approx H*k$ constant For instance, the spring is chosen with an elongation E of 117 mm when there is no envelope in the transport path.

At θ0 corresponding to no envelope $Ct=H*T=47*k*117$ (length in mm)

$Cp=P*D=P*137$ thus $P0=40.1387*k$

At θ19 corresponding to an envelope 19 mm thick $Ct=H*T=47*k*123$ (length in mm)

$Cp=P*D=P*144$ thus $P19=40.1458*k$

With a stiffness k of 0.5 N/mm, the load effort is 20.0698 N when there is no envelope and 20.0729 N with an envelope 19 mm thick. The difference is 0.0036 N or 0.36 grams. As H, D and the elongation are quasi-linear functions of θ in the considered interval, it can be easily verified that all intermediate values of the load are in the same range.

In practice the spring shall not only support the envelope but also the whole conveyor including frame, motor pulleys and belts, and furthermore balance the weight of the weighing plate. The stiffness of the spring is more likely to be in the range of 1 N/mm so that the load cell is sensibly constantly loaded. In this case the load difference between thin and thick envelopes increases but remains below one gram in conformity with the postal requirements.

Figure 4:
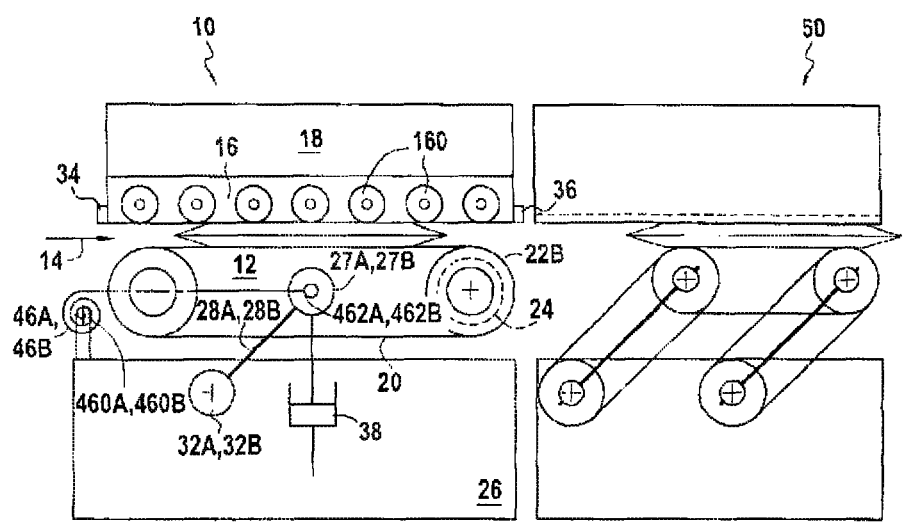
FIG. 4 shows a schematic view of still another implementation of the device for weighing flat objects in motion using a spiral spring system to maintain a sensibly constant load of the transport path on the weighing sensor.

FIG. 4 illustrates a third embodiment of the device for weighing flat objects in motion according to the invention. In this embodiment, the tension spring 44A, 44B and the pulley 42A, 42B of the second embodiment are replaced by a spiral spring 46A, 46B and the traction cable 40A, 40B is no longer useful. With this configuration a sensibly constant load is applied to the weighing plate 16 too. As in previous embodiments, the conveyor 12 comprises at least a conveyor belt 20 driven by the drive rollers 22A, 22B engaged with a motor 24. The conveyor 12 is vertically movable in the frame (or chassis 26) of the device through at least first pivot connection 27A, 27B and at least a lever arm 28A, 28B. More particularly, the upper ends of the two lever arms 28A, 28B are attached by a first pivot connection 27A, 27B on each side of the conveyor 12, sensibly midway between the drive rollers 22A, 22B. The other ends of lever arms are attached to the chassis 26 of the device via a second pivot connection 32A, 32B. In this embodiment, spiral springs 46A, 46B are attached by their central end 460A, 460B to the chassis 26 (for instance in place of the pulley 42A, 42B of the second embodiment), the other ends 462A, 462B of the spiral spring 46A, 46B are attached to the upper ends of the two lever arms 28A, 28B.

The spiral spring 46A, 46B is mounted elongated so that when the device is at rest (ie. no mail item on the transport path 14), the springs are elongated.

The spiral spring will apply a momentum $M_{/oz}$ to the chassis equal to $k_0 \alpha$, where $k_0$ is the angular stiffness and $\alpha$ is the angular deformation. The momentum $M_{/oz}$ is equal to $T*r$ where r is the external radius of the spring and the linear elongation of the spring E is equal to $r*\alpha$. Then the tension T is equal to $k_0*E/r^2$. The spiral spring is chosen so that its external radius remains sensibly constant between the upper and lower positions of the arm so T remains sensibly proportional to E as in the previous embodiment.

While the invention has been described with reference to exemplary embodiments, it will be understood by those skilled in the art that various changes may be made and equivalents may be substituted for elements thereof without departing from the scope of the invention. For instance, all embodiment are described with two load application systems (arms and counterweights, arms and tension springs, arms and spiral springs), attached of each side of the conveyor, but it is clear for those skilled in the art that a single load application system attached to one side or the center of the conveyor path can be used. In addition, many modifications (other spring and non spring arrangements are possible to ensure at least a sensibly constant (and preferably a constant) load whatever the thickness of the envelope being weighed) may be made to adapt a particular situation or material to the teachings of the invention without departing from the essential scope thereof. For example, the device for weighing flat objects can also include an access ramp to transfer the mail item to the weighing plate. The access ramp can have two drive rollers and a conveyor belt, the lower part of which is at the height of the transport path of the feeding area while the top is at the height of the weighing plate.

It shall be noted that a sensibly constant load (and a fortiori a constant load) whatever is the thickness of the envelope is not an absolute requirement of the system. As letter dimensions are required in order to calculate certain postage rates, franking machines—and notably the ones having dynamic scales—are equipped with thickness sensors. Then it is possible to tabulate the load in function of thickness and to apply the appropriate correction. However a constant or sensibly constant load is preferable to variable load in order to simplify the calculation of the weight.

Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. Device for weighing flat objects in motion comprising a conveyor (12) comprising drive rollers (22A, 22B) having a first horizontal axis for conveying along a horizontal transport path (14) the flat objects laying on the conveyor by one of their flat surface, a weighing plate (16) above the conveyor and facing said horizontal transport path and comprising a set of free rollers (160) having a second horizontal axis for receiving the flat surface of the flat objects oriented horizontally, and a weighing sensor (18) attached to the weighing plate for measuring the weight of the flat objects during their passage along the horizontal transport path between the conveyor and the weighing plate, the weighing sensor senses a load applied to at least the weighing sensor, wherein the weighing sensor is arranged above the conveyor and the horizontal transport path and the conveyor is configured to move vertically and thereby press, in a vertical direction, the flat objects in motion against the weighing plate such that the sensed load is inversely proportional to the weight of the flat objects.

2. Device according to claim 1, wherein the conveyor is adapted to further apply a load which is constant regardless of the thickness of the flat object.

3. Device according to claim 2, wherein the load applied by the conveyor is obtained by a balance system comprising at least one lever arm (28A, 28B) attached at its upper end to the conveyor by a first pivot connection (27A, 27B) and attached at its lower end to a counterweight (30A, 30B), said at least one lever arm being adapted to rotate around at least a second pivot connection (32A, 32B) attached to a chassis (26) of the device and attached to the at least one lever arm between its upper and lower ends.

4. Device according to claim 1, wherein the conveyor is adapted to further apply a load which is sensibly constant regardless of the thickness of the flat object.

5. Device according to claim 1, wherein the conveyor comprises at least one conveyor belt (20) driven by said drive rollers.

6. Device according to claim 1, wherein the load applied by the conveyor is obtained by a spring system comprising at least one lever arm (28A, 28B) attached at its lower end to a chassis (26) of the device by a second pivot connection (32A, 32B) and attached at the upper end to the conveyor by a first pivot connection (27A, 27B), and at least one spring (44A, 44B) attached to the chassis of the device and pushing the conveyor vertically in the upper direction.

7. Device according to claim 6, wherein said at least one spring has a tensile elongation at least equal to the length of the horizontal projection of said at least one lever arm.

8. Device according to claim 6, wherein said at least one spring has a stiffness coefficient of at least 0.5 N/mm and typically 1 N/mm.

9. Device according to claim 6, wherein the spring is a tension spring (44A 44B) attached at its lower end to the chassis of the device and at its upper end to one end of at least a traction cable (40A, 40B) running around at least one pulley (42A, 42B) and the other end of said at least one traction cable is connected to the upper end of said at least one lever arm.

10. Device according to claim 6, wherein the spring is a spiral spring (46A, 46B) attached at its central end to the chassis (26) of the device, the other end of said at least one spiral spring being attached to the upper end of said at least one lever arm.

11. Device according to claim 1, wherein a dashpot (38) is placed under the conveyor in order to reduce shocks and vibrations due to the passage of flat objects on the transport path.

12. Device according to claim 1, wherein the flat objects are envelopes.

13. Mailing machine comprising a device for weighing envelopes in motion according to claim 12.

* * * * *